United States Patent
Chang et al.

(10) Patent No.: US 7,942,072 B2
(45) Date of Patent: May 17, 2011

(54) FLEXIBLE FORCE SENSOR WITH COUPLING TYPE AND MULTI-DIRECTIONAL RECOGNITIONS

(75) Inventors: Wen-Yang Chang, Yunlin County (TW); Heng-Ju Lin, Tainan (TW); Yu-Tang Shen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 192 days.

(21) Appl. No.: 12/392,824

(22) Filed: Feb. 25, 2009

(65) Prior Publication Data

US 2010/0175486 A1 Jul. 15, 2010

(30) Foreign Application Priority Data

Jan. 15, 2009 (TW) .............................. 98101343 A

(51) Int. Cl.
*G01L 1/22* (2006.01)
*G01D 7/00* (2006.01)
(52) U.S. Cl. .............................. 73/862.044; 73/861.041
(58) Field of Classification Search .................. 73/862.041–862.046
See application file for complete search history.

(56) References Cited

U.S. PATENT DOCUMENTS

| 4,578,735 | A * | 3/1986 | Knecht et al. ............... 361/283.4 |
| 4,609,770 | A * | 9/1986 | Nishiura et al. ............... 136/244 |
| RE37,065 | E | 2/2001 | Grahn |
| 6,951,143 | B1 | 10/2005 | Adderton et al. |
| 7,178,405 | B2 * | 2/2007 | Sato ................................ 73/818 |
| 7,295,724 | B2 | 11/2007 | Wang et al. |
| 7,723,128 | B2 * | 5/2010 | Wang et al. ........................ 438/3 |
| 7,823,467 | B2 * | 11/2010 | Taya et al. ................. 73/862.625 |
| 2004/0131907 | A1 * | 7/2004 | Arita et al. ....................... 429/30 |

FOREIGN PATENT DOCUMENTS

JP 2008-8854 A 1/2008

OTHER PUBLICATIONS

China Patent Office, Office Action, Patent Application Serial No. 200910002974.2, Dec. 31, 2010, China.

* cited by examiner

*Primary Examiner* — Max Noori

(57) ABSTRACT

A force sensor includes a substrate, a support layer, a film, a plurality of sensing portions, a plurality of electrodes, a plurality of sensing materials, and a filler. The support layer is disposed on the substrate. The film is supported by the support layer. The sensing portions extend from the film. The electrodes are correspondingly disposed on the sensing portions. The sensing materials are correspondingly disposed on the electrodes. The support layer, the film, the sensing portions, the electrodes, and the sensing materials encapsulated by the filler.

9 Claims, 5 Drawing Sheets

FLEXIBLE FORCE SENSOR WITH COUPLING TYPE AND MULTI-DIRECTIONAL RECOGNITIONS

BACKGROUND OF THE INVENTION

1. Field of the Invention

The invention relates to a flexible force sensor of coupling type and multi-directional recognitions, and more particularly to a flexible force sensor capable of sensing normal stresses and shear stresses.

2. Description of the Related Art

In general, the force sensors with normal and shear sensing are mostly bulk-shaped and therefore not applicable to detection on irregular surfaces. Furthermore, conventional force sensors are difficult to sense normal stresses, shear stresses, or both in the array-type detection of the large area.

U.S. Pat. No. 6,951,143 discloses a stress sensor of coupling type, wherein a square-based pyramid has a strain gauge on each side thereof. A first pair of strain gauges disposed along a first pair of respective axes that intersect and the other pair of strain gauges, generally orthogonal to first direction, disposed along a second pair of respective axes that intersect. The deformations of a pair of strain gauges on two opposite sides of the square-based pyramid are different when a shear stress, along X or Y directions, is applied to the sensor. One of the strain gauge is tensed, and the other is compressed. Therefore, the magnitude and direction of the shear stress can be calculated. The deformations of the four strain gauges are equal after a normal stress is applied to the sensor. The magnitude and direction of the normal stress can be also calculated.

U.S. Pat. No. RE37065 discloses a normal and shear force sensor using reflections of ultrasonic waves. The sensor includes a plurality of ultrasonic transducers and a hemispherical element. The transducers are oriented at an oblique angle to the plane and aimed at the hemispherical element. The hemispherical element is displaced as a lateral shear stress is applied to the hemispherical element. Thus, the transit paths and the transit times of the ultrasonic waves are different from two opposite sides of the transducer. The change of the transit time can be used to calculate the magnitude and direction of the shear stress. When a normal stress is applied to the hemispherical element, the transit paths of the ultrasonic waves on two opposite sides of the hemispherical element are equal. Thus, the reflection times of the ultrasonic waves are the same. Accordingly, the magnitude and direction of the normal stress can be calculated.

BRIEF SUMMARY OF THE INVENTION

A force sensor in accordance with an exemplary embodiment of the invention includes a flexible substrate, a support layer, a film, a plurality of sensing portions, a plurality of electrodes, a plurality of sensing material, and a filler. The support layer is disposed on the flexible substrate. The film is supported by the support layer. The sensing portions extend from the film. The electrodes are correspondingly disposed on the sensing portions. The sensing materials are correspondingly disposed on the electrodes. The support layer, the film, the sensing portions, the electrodes, and the sensing materials encapsulated by the filler.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
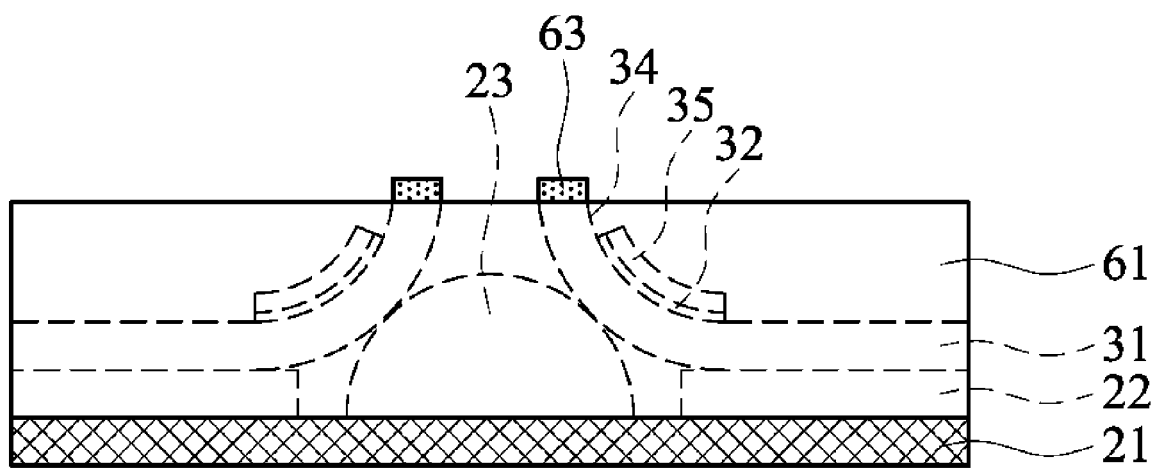
FIG. 1 is a schematic diagram of a flexible force sensor in accordance with an embodiment of the invention.

FIG. 1 is a schematic diagram of a flexible force sensor in accordance with an embodiment of the invention, wherein only one sensing unit of the flexible force sensor is shown. In the practical application, however, a plurality of sensing units can be used and arranged in an array to provide large-area detection. As shown, the flexible force sensor includes a flexible substrate 21, a support layer 22, a support 23, a plurality of sensing portions 34, a plurality of electrodes 32, a plurality of sensing materials 35, a plurality of bumps 63, and a filler 61. Prior to the descriptions of the operation, the process of manufacturing the flexible force sensor is introduced.

Figure 2A:
FIGS. 2A, 2B, and 2C depict the process of manufacturing a first part of the flexible force sensor of FIG. 1.
Figure 2B:
Figure 2C:
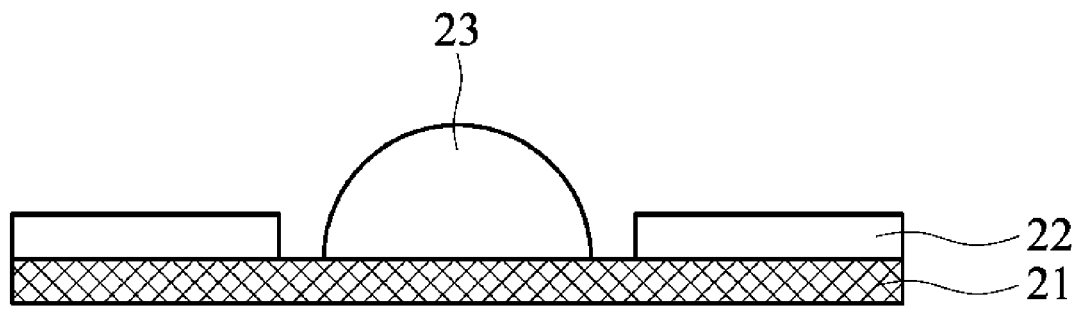

The flexible force sensor can be divided into a first part and a second part. The process of manufacturing the first part is shown in FIGS. 2A, 2B, and 2C, and the process of manufacturing the second part is shown in FIGS. 3A, 3B, 3C, and 3D.

The first part is manufactured as follows. As shown in FIG. 2A, a flexible substrate 21 is provided. Then, as shown in FIG. 2B, a support layer 22 is formed on the flexible substrate 21 by adhering, attaching, printing, or spot-gluing. Then, as shown in FIG. 2C, a support 23 is provided by printing (or spot gluing) and heat-curing. In this embodiment, the support 23 is hemispherical.

Figure 3A:
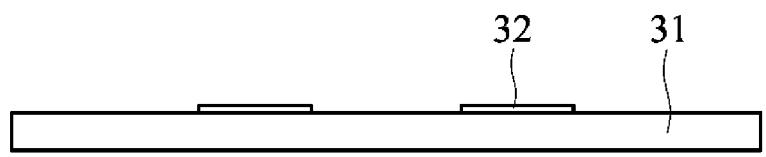
FIGS. 3A, 3B, 3C, and 3D depict the process of manufacturing a second part of the flexible force sensor of FIG. 1.
Figure 3B:
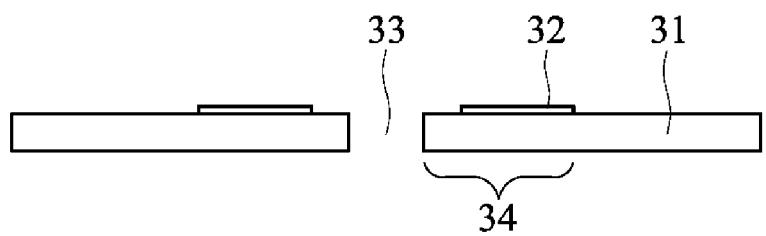
Figure 3C:
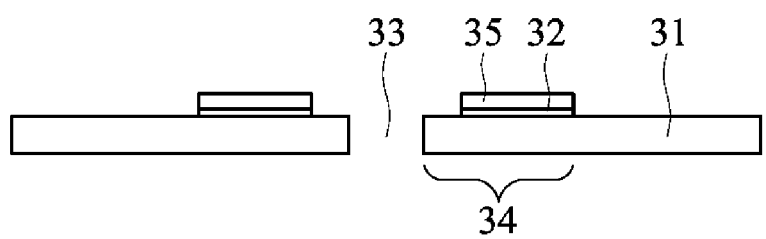
Figure 3D:
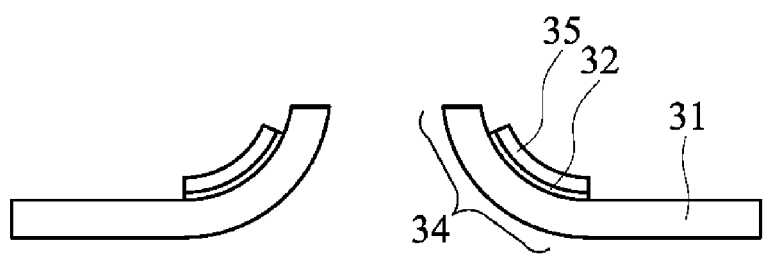
Figure 4:
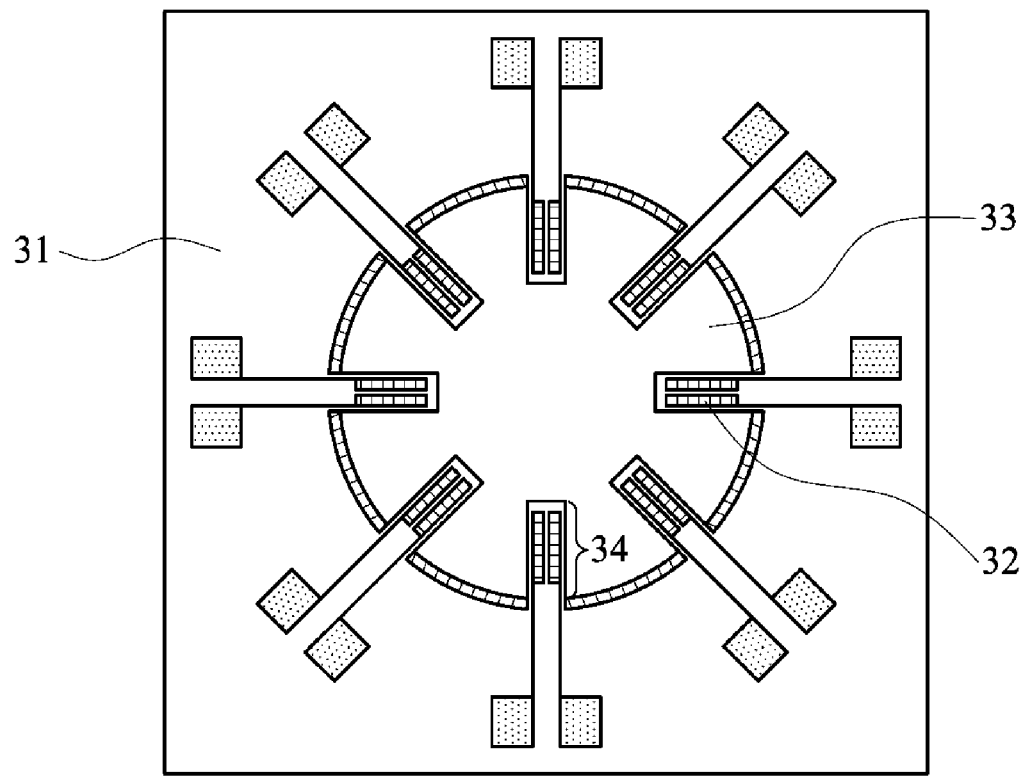
FIG. 4 is a top view of the film of FIG. 3B.
Figure 5:
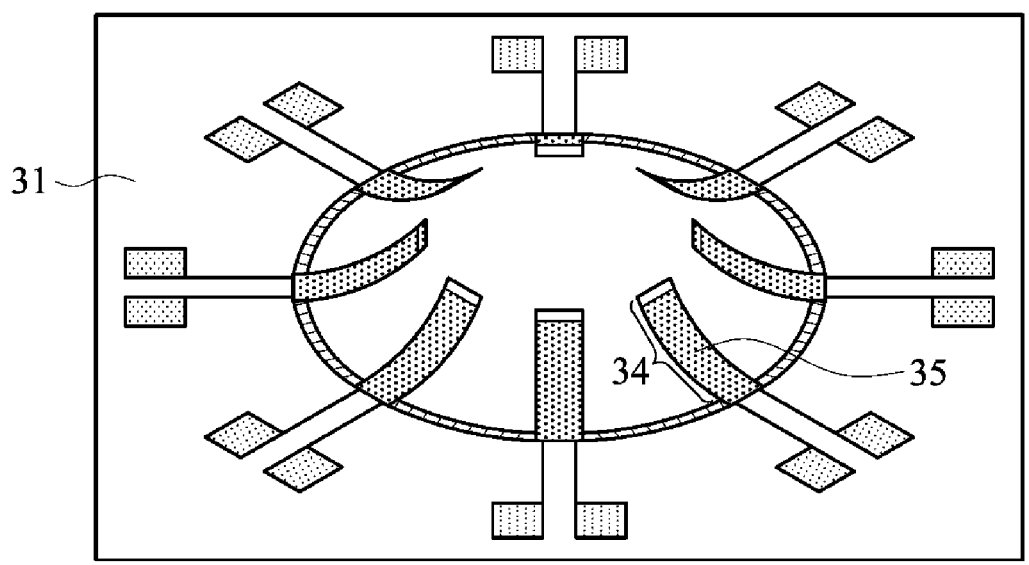
FIG. 5 is a perspective diagram of the film of FIG. 3D.

The second part is manufactured as follows. As shown in FIG. 3A, the film 31 with metal foil provided thereon is etched to produce a plurality of electrodes (and conductive lines) 32. Then, as shown in FIG. 3B, an opening 33 is produced in the film 31 by punching or other processing methods to define a plurality of sensing portions 34. FIG. 4 is a top view of the film of FIG. 3B, wherein the sensing portions 34 are cantilevered out from the film 31. Then, as shown in FIG. 3C, a plurality of sensing materials 35 are formed on the electrodes 32. The sensing materials 35 may be made of resistance material, piezoresistive material, piezoelectric material, inductance material, electromagnetic material, or thermoelectric material. Then, as shown in FIG. 3D, heating and baking are executed. The sensing portions 34 thus become curved as shown in FIG. 5 because the sensing portions 34 and the sensing materials 35 are made of different materials.

Figure 6A:
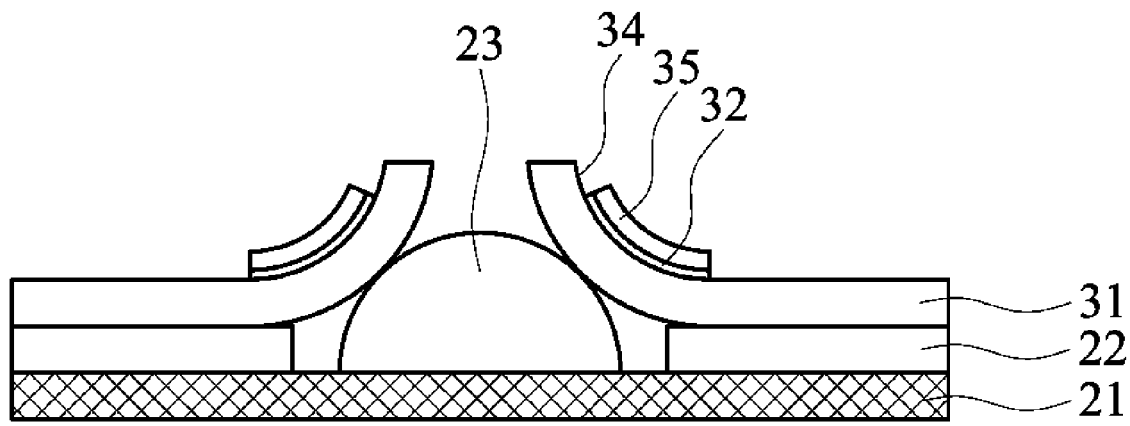
FIG. 6A is a schematic diagram of the assembled first part and second part of the flexible force sensor.
Figure 6B:
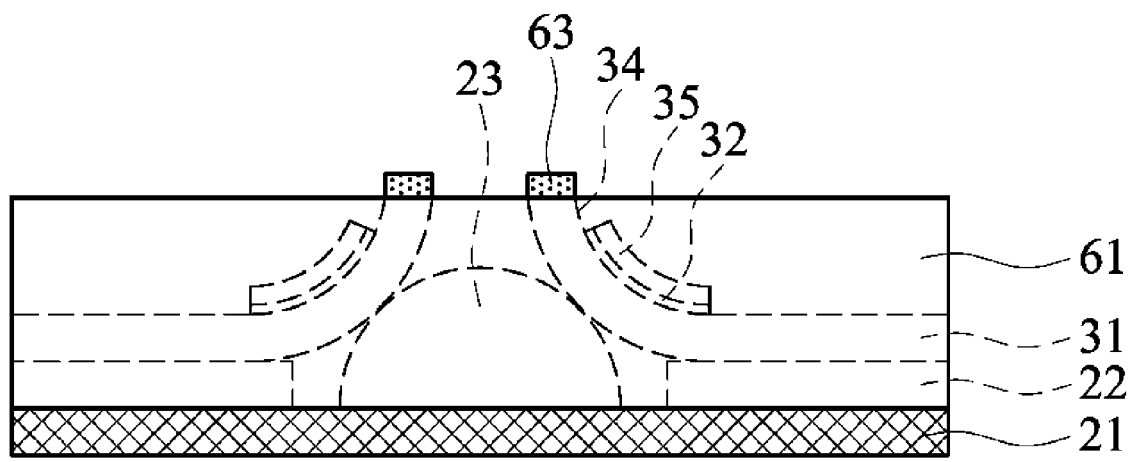
FIG. 6B is a schematic diagram of the packaged flexible force sensor.

The first part (FIG. 2C) and the second part (FIG. 3D) are then assembled. Referring to FIG. 6A, the support 23 is correctly located under the sensing portions 34. Thus, the curved sensing portions 34, supported by the hemispherical support 23, have the same curved angle and height. Then, as shown in FIG. 6B, a packaging process is executed using the polymer filler 61 by injection or glue-pouring. Generally, the polymer filler 61 and the support 23 are made of the same material. Finally, the bumps 63 are formed on the tops of the sensing portions 34 by printing. Note that the softness of the filler 61 is lower than that of the sensing portions 34 to avoid reducing the sensitivity of the force sensor, the package is as height as the curved sensing portions 34, and the bumps 63 are significantly harder than the sensing portions 34.

In operation, the magnitudes of the normal stress and the shear stress can be detected by the curved sensing portions 34 and the sensing material 35. The sensing portions 34 are provided in pairs, for judging the directions of the stresses in accordance with the difference between the stresses applied to the sensing materials 35.

Generally, controlling the sensing portions 34 to have the same curved angle and height only by thermal expansion is difficult. In this embodiment, the curving of the sensing portions 34 is controlled by the support 23. Therefore, the mechanical deformation of the sensing portions 34 can be accurately controlled. It is understood that the support 23 may be modified to be rectangular or polygonal, still providing the same function.

The sensitivity of the sensing portions 34 may be reduced due to the packaging of the polymer filler 61. The invention, therefore, provides bumps 63 on the tops of the sensing portions 34 to avoid the problem. The shape of the bumps 63 is not limited. Hemispherical, rectangular, polygonal, etc. are feasible.

When the packaging is physically touched, the bumps 63 are pressed or squeezed, a stress concentration is generated on the tops of the sensing portions 34, and the curved sensing portions 34 are deformed downward. Because the curved sensing portions 34 are connected to the bumps 63 that increase the moment of inertia of the sensing portions 34 during displacement, the failure stresses on the sensing portions 34 can be reduced and the restoring elasticity of the sensing portions 34 can be increased.

The flexible force sensor of the invention is not a hard microsensor manufactured by the semiconductor or micro electro mechanical systems (MEMS) process. Rather, the flexible force sensor of the invention is manufactured by the soft electronic printing technology, therefore capable of avoiding fracture of the sensor and reducing the manufacturing cost and the complication.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A force sensor, comprising:
   a flexible substrate;
   a support layer disposed on the flexible substrate;
   a film supported by the support layer;
   a plurality of sensing portions extending from the film;
   a plurality of electrodes correspondingly disposed on the plurality of sensing portions;
   a plurality of sensing materials correspondingly disposed on the plurality of electrodes; and
   a filler encapsulating the support layer, the film, the plurality of sensing portions, the plurality of electrodes, and the plurality of sensing materials.

2. The flexible force sensor as claimed in claim 1, wherein the plurality of sensing portions is provided in pair.

3. The flexible force sensor as claimed in claim 1, wherein the plurality of sensing portions is curved.

4. The flexible force sensor as claimed in claim 3, further comprising a support which is disposed on the flexible substrate and supports the plurality of sensing portions.

5. The flexible force sensor as claimed in claim 4, wherein the support is hemispherical, rectangular, or polygonal.

6. The flexible force sensor as claimed in claim 1, wherein the plurality of sensing materials is made of resistance material, piezoresistive material, piezoelectric material, inductance material, electromagnetic material, or thermoelectric material.

7. The flexible force sensor as claimed in claim 1, further comprising a plurality of bumps correspondingly connected to tops of the plurality of sensing portions.

8. The flexible force sensor as claimed in claim 7, wherein the plurality of bumps is hemispherical, rectangular, or polygonal.

9. The flexible force sensor as claimed in claim 1, wherein the filler and the support are made of the same polymer.

* * * * *